March 15, 1932.      E. F. SAWLSVILLE      1,850,065
CAR MOVER
Filed Aug. 23, 1930
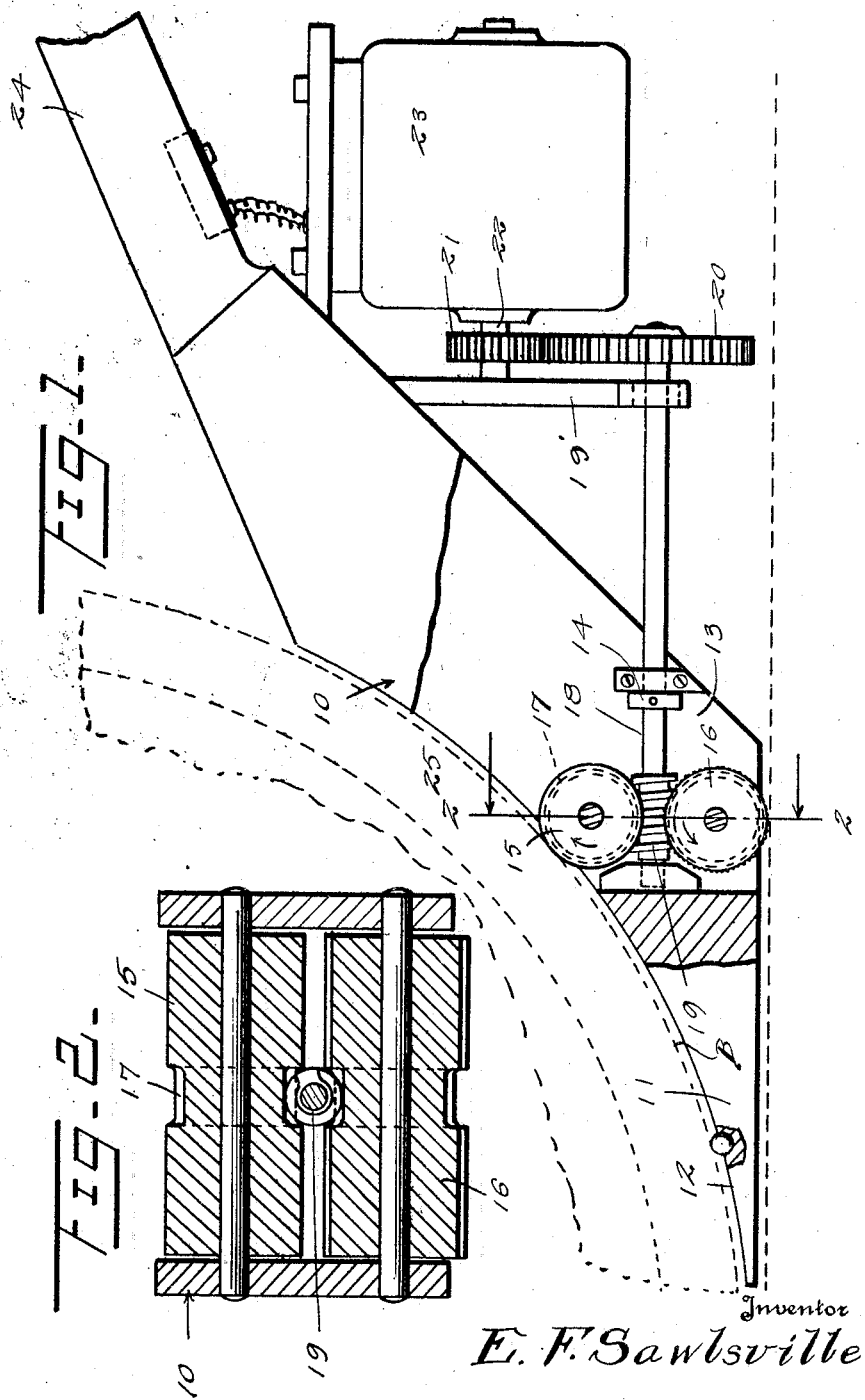
Inventor
E. F. Sawlsville
By Watson E. Coleman
Attorney Patented Mar. 15, 1932

1,850,065

UNITED STATES PATENT OFFICE

EDWARD F. SAWLSVILLE, OF ELAND, WISCONSIN, ASSIGNOR OF ONE-HALF TO LYLE H. SAWLSVILLE, OF OSHKOSH, WISCONSIN

CAR MOVER

Application filed August 23, 1930. Serial No. 477,443.

This invention relates to devices for shifting cars, particularly freight cars and the general object of the invention is to provide a car mover adapted to be driven by an electric motor and so arranged as to apply power to a wheel of the car to shift the car slowly along the rails.

A further object is to provide a mechanism of this character which includes a wedge-shaped prow carrying a wheel adapted to engage with the track and a wheel adapted to engage with one of the wheels of the car, and an electric motor with means for transmitting power from the electric motor to the said wheels to thus cause the advance of the car moving device along a rail and push the car along the rail to the point desired, the prow acting as a block preventing any backing up or reverse movement of the car.

Other objects will appear in the course of the following description.

My invention is illustrated in the accompanying drawings, wherein:—

Figure 1 is a side elevation, partly broken away showing my improved car mover;

Figure 2 is a section on the line 2—2 of Figure 1.

Referring to these drawings, 10 designates a supporting frame which extends upward and rearward and which in cross section has the form of an inverted V. This is formed at its forward extremity with a solid prow 11, the curved upper edge face 12 of which is relatively wide and adapted to bear against the periphery of the car wheel. The rear of this frame or housing is open as at 13, and carries a thrust bearing 14. Mounted between the side walls of the housing are the upper and lower rolls 15 and 16. The upper roll is smooth and has a width approximately equal to the thread face of the car wheel, the middle of the roll being formed with teeth 17. The lower roll 16 is knurled or otherwise formed so as to grip the rail A. This at its middle is also formed with gear teeth. Extending between the rolls is a worm shaft 18 having the worm 19 engageable with the teeth on the upper and lower rolls to rotate these upper and lower rolls. The worm shaft is mounted in the thrust bearing 14 and extends rearward and is carried by a suitable supporting bracket or brace 19'. At its rear end, the shaft is provided with a gear 20 engaged by a pinion 21 mounted on a motor shaft 22 of a motor 23. The frame or housing 10 is provided with an upwardly extending handle 24. A suitable length of flexible conductor is connected to the motor so that the power may be transmitted thereto from any source of electric current.

The wheel 15, it will be noted, extends through a slot 25 in the housing or frame so as to come in contact with the wheel B of the car to be moved. Wheels 15 and 16, of course rotate in opposite directions, the wheel 15 rolling against the car wheel, the wheel 16 rolling against the track and having sufficient tractive engagement therewith as to force the prow forward, the wheel 15 causing the car wheel to rotate slowly.

By means of this device, a freight car may be readily shifted along a track without the necessity of using a crow for this purpose, the prying action of the crow being extremely slow and requiring a large amount of effort to be expended. With my device, not only is the power taken from an electric motor, but the car is much more expeditiously used than is possible with other devices known to me. At the same time the wedge-shaped prow or nose 11 prevents the car from moving backward and acts as a block.

I claim:—

1. A car mover of the character described comprising a hollow element having a prow longitudinally curved along its upper edge face to fit between the car wheel and a track, a roll disposed within said hollow element and engageable with the track, a second roll disposed within the hollow element and extending through the upper face of the same and engageable with the car wheel, a worm shaft engaging both of said rolls and rotating them in opposite directions, and a motor supported in connection with the hollow element and operating said worm shaft.

2. A car mover of the character described, comprising a housing having an upwardly inclined rear portion and an approximately wedge-shaped prow, the upper face of the prow being curved to conform to the curvature of the car wheel, the housing being hollow, a lower roll mounted within the housing and adapted to engage a track rail, an upper roll mounted within the housing and projecting through the top thereof and adapted to engage the car wheel, a worm shaft mounted longitudinally in said element and engaging said rolls to drive them in opposite directions, a motor mounted upon said housing at the rear end thereof, gearing connecting said motor with the worm shaft, and a handle extending upward and rearward from the housing.

3. In a car mover of the character described, comprising a hollow element having a prow longitudinally curved along its upper edge face to fit between the car wheel and the track, a roll disposed within said hollow element and engageable with the track, a second roll disposed within the hollow element and extending through the upper face thereof and engageable with the car wheel, and a worm shaft engaging both of said rolls and rotating them in opposite directions when actuated.

4. A car mover of the character described, comprising a hollow element adapted to be disposed between a car wheel and a track, a roll disposed within the hollow element and engageable with the track, a second roll disposed within the hollow element and extending through the upper face thereof and engageable with the car wheel, and a worm shaft engaging both of said rolls and rotating them in opposite directions when the worm shaft is actuated.

5. A car mover of the character described, comprising a hollow element adapted to be disposed between the car wheel and the track and having its front face concavely curved to fit a car wheel, a handle extending upwardly and rearwardly from the body, a roll disposed within the hollow element and engageable with the track, a second roll disposed within the hollow element and extending through the concavely curved face thereof and engageable with the car wheel, and motor operated means carried by the car mover to operatively engage with said rolls to rotate them in opposite directions.

In testimony whereof I hereunto affix my signature.

EDWARD F. SAWLSVILLE.